(12) United States Patent
Wang et al.

(10) Patent No.: US 12,351,222 B2
(45) Date of Patent: Jul. 8, 2025

(54) INTEGRATED RAILWAY MOVEMENT DISPATCHING AND TRAIN OPERATION CONTROL METHOD, SYSTEM, AND APPLICATION

(71) Applicants: SIGNAL & COMMUNICATION RESEARCH INSTITUTE, CHINA ACADEMY OF RAILWAY SCIENCES CORPORATION LTD., Beijing (CN); BEIJING HUATIE INFORMATION TECHNOLOGY CORPORATION LTD., Beijing (CN); CHINA ACADEMY OF RAILWAY SCIENCES CORPORATION LTD., Beijing (CN); BEIJING RUICHIGUOTIE INTELLIGENT TRANSPORTATION SYSTEM ENGINEERING CORPORATION LTD., Beijing (CN)

(72) Inventors: Rongsheng Wang, Beijing (CN); Qi Zhang, Beijing (CN); Tao Zhang, Beijing (CN); Zhiming Yuan, Beijing (CN); Tao Wang, Beijing (CN); Shuxin Ding, Beijing (CN)

(73) Assignees: SIGNAL & COMMUNICATION RESEARCH INSTITUTE, CHINA ACADEMY OF RAILWAY SCIENCES CORPORATION LTD., Beijing (CN); BEIJING HUATIE INFORMATION TECHNOLOGY CORPORATION LTD., Beijing (CN); CHINA ACADEMY OF RAILWAY SCIENCES CORPORATION LTD., Beijing (CN); Beijing Ruichiguotie Intelligent Transporation System Engineering Corporation LTD., Beijing (CN)

( * ) Notice: Subject to any disclaimer, the term of this patent is extended or adjusted under 35 U.S.C. 154(b) by 0 days.

(21) Appl. No.: 18/863,628

(22) PCT Filed: Dec. 6, 2022

(86) PCT No.: PCT/CN2022/136713
§ 371 (c)(1),
(2) Date: Nov. 6, 2024

(87) PCT Pub. No.: WO2023/245998
PCT Pub. Date: Dec. 28, 2023

(65) Prior Publication Data
US 2025/0108843 A1 Apr. 3, 2025

(30) Foreign Application Priority Data
Jun. 22, 2022 (CN) .......................... 202210707833.6

(51) Int. Cl.
*B61L 27/16* (2022.01)
*B61L 27/04* (2006.01)
*B61L 27/20* (2022.01)

(52) U.S. Cl.
CPC ............... *B61L 27/16* (2022.01); *B61L 27/04* (2013.01); *B61L 27/20* (2022.01)

(58) Field of Classification Search
CPC .......... B61L 27/00; B61L 27/04; B61L 27/16; B61L 27/20; B61L 25/02
See application file for complete search history.

(56) References Cited

U.S. PATENT DOCUMENTS

2022/0055672 A1    2/2022  Yu et al.

FOREIGN PATENT DOCUMENTS

| CN | 102387953 A | 3/2012 |
| CN | 102514602 A | 6/2012 |

(Continued)

OTHER PUBLICATIONS

Geng Hongliang, Zhang Chao, "Concept of Integrated Design and Analysis of Train Control System", Electric Drive for Locomotives, Jul. 10, 2018, pp. 47-49, Issue No. 4, China (with English translation, 7 pages).

*Primary Examiner* — Robert J McCarry, Jr.
(74) *Attorney, Agent, or Firm* — MUNCY, GEISSLER, OLDS & LOWE, P.C.

(57) ABSTRACT

An integrated railway movement dispatching and train operation control method, comprising: sensing in-transit information of a signal system; constructing an integrated railway movement dispatching and train operation control minimum system; optimizing a time-saving train driving (Continued)

strategy online; optimizing a multi-train driving strategy in a virtual formation mode; and generating an integrated railway movement dispatching and train operation control adjustment solution.

7 Claims, 6 Drawing Sheets

(56) References Cited

FOREIGN PATENT DOCUMENTS

| | | | | |
|---|---|---|---|---|
| CN | 102582665 A | | 7/2012 | |
| CN | 102608991 A | | 7/2012 | |
| CN | 114771607 A | | 7/2012 | |
| CN | 102616255 A | * | 8/2012 | ............. B61L 27/00 |
| CN | 107235054 A | * | 10/2017 | ............. B61L 27/04 |
| CN | 110155126 A | | 8/2019 | |
| CN | 111232024 A | | 6/2020 | |
| CN | 113525461 A | * | 10/2021 | ............. B61L 27/00 |
| CN | 113552801 A | | 10/2021 | |
| CN | 113562039 A | | 10/2021 | |
| WO | WO-2012/149761 A1 | | 11/2012 | |

* cited by examiner

INTEGRATED RAILWAY MOVEMENT DISPATCHING AND TRAIN OPERATION CONTROL METHOD, SYSTEM, AND APPLICATION

This application claims priority to Chinese Application No. 202210707833.6 filed Jun. 22, 2022, the disclosure of which is incorporated herein by reference in its entity.

FIELD

The present application relates to a method and a system in railway signaling, traffic dispatching, and train operation control, and more particularly relates to a method for integrating railway traffic dispatching and train operation control, and an integrated system of railway traffic dispatching and train operation control, and an application of the same.

BACKGROUND

China's high-speed railway network is by far the most complex in the world, with the longest total operating mileage and the highest passenger traffic. In networked operation, emergencies such as infrastructure failure, foreign object intrusion, and passenger traffic surge would occur at times, and in worse situations, they would cause passenger stranding and line disruption. When an emergency occurs, signaling subsystems including a train dispatching command system, a train operation control system, and an interlocking system collaborate for safe, efficient train movements. Train journey data such as train movement dispatching information, static line data, and train operation status information are communicated between the signaling subsystems; a dispatcher issues a dispatching command and a phased adjustment plan based on his/her personal experience, and a train driver controls operation of the train based on his/her driving experience according to train-ground information communicated from the train operation control system. However, the train journey data is presently only stored and communicated between the signaling subsystems, with low information fusion and utilization. The phased adjustment plan and the train driving strategy still fully rely on a decision-making based on personal experience, not based on the train journey data and a computing algorithm, so that automation and smart levels need to be improved. Therefore, to satisfy the "information integration" need across various signaling subsystems, it is significant to research integrated railway traffic dispatching and train operation control so as to enhance railway operating efficiency and atomization.

SUMMARY

A method disclosed herein intends to overcome drawbacks that existing railway signaling systems have a low utilization of train journey data, and phased adjustment plan and train driving strategy mainly rely on personal experience-based decision-making. Firstly, to satisfy "information integration" demand across railway signaling subsystems, an integral decision-maker for railway traffic dispatching and train operation control is incorporated to receive all train journey data, and an integrated adjustment plan is calculated and generated. Then, a knowledge-of-expert rule-based online optimization scheme for time-optimal train driving strategy is presented. Finally, a multi-train driving strategy optimization scheme based on a virtual formation mode is presented to calculate and generate a graphic train schedule and a multi-train target speed profile under the integrated method, so as to provide a recommended solution of phased plan adjustment and an assistant driving strategy for a dispatcher and a train, respectively. A technical solution of the present application is set forth below:

A method for integrating railway traffic dispatching and train operation control, comprising:
  Step S1: receiving, by a radio block center RBC, train journey data communicated from a central dispatching command system and an interlocking system when a signaling system detects occurrence of any type of emergency;
  Step S2: constructing a minimum system of integrated railway traffic dispatching and train operation control, incorporating an integrative decision-maker, and forwarding the train journey data to the integrative decision-maker via the radio block center RBC;
  Step S3: online optimizing a time-optimal train driving strategy, comprising constructing a sectional temporary speed restriction scenario in consideration of a coupling relationship between a train operation condition and an acting force, online optimizing the time-optimal train driving strategy based on a knowledge-of-expert rule, and calculating train operation status information;
  Step S4: optimizing a multi-train driving strategy based on a virtual formation mode, comprising: clustering train groups based on different speed restriction values of multiple trains, and presenting a multi-train driving strategy optimization scheme based on the virtual formation mode;
  Step S5: generating an adjusted plan of integrated railway traffic dispatching and train operation control, comprising: transmitting a graphic train schedule to the central dispatching command system to assist a dispatcher to adjust a phased plan, and transmitting a multi-train target speed profile to each train on a line to assist in driving strategy optimization.

The present disclosure further discloses an integrated system of railway traffic dispatching and train operation control.

The method for integrating railway traffic dispatching and train operation control as noted supra is applied to high-speed railway operation.

The benefits offered by the present disclosure may be summarized as follows:
  The present disclosure incorporates an integrative decision-maker for railway traffic dispatching and train operation control to conventional signaling system architecture, the integrative decision-maker being configured to receive train journey data communicated from respective signaling subsystems; a graphic train schedule and a multi-train target speed profile satisfying integration requirements are calculated and generated to assist in real-time a dispatcher and a train to adjust the phased plan and the driving strategy, thereby alleviating labor intensities of dispatchers and drivers and enhancing railway operation efficiency;
  The method disclosed herein provides a knowledge-of-expert rule-based online optimization scheme of time-optimal train driving strategy, which realizes online real-time adjustment of driving strategies and real-time prediction of train status information within a future operation section;
  The method disclosed herein presents a virtual formation-based multi-train driving strategy optimization scheme, which realizes adjustment of inter-train tracking headway and tracking distance by clustering train groups, and generates in real time an adjusted plan of integrated railway traffic dispatching and train operation control, the adjusted plan including a graphic train schedule and a multi-train target speed profile, which are transmitted to the central dispatching command system and respective running trains on the line, respectively.

DETAILED DESCRIPTION OF EMBODIMENTS

Figure 1:
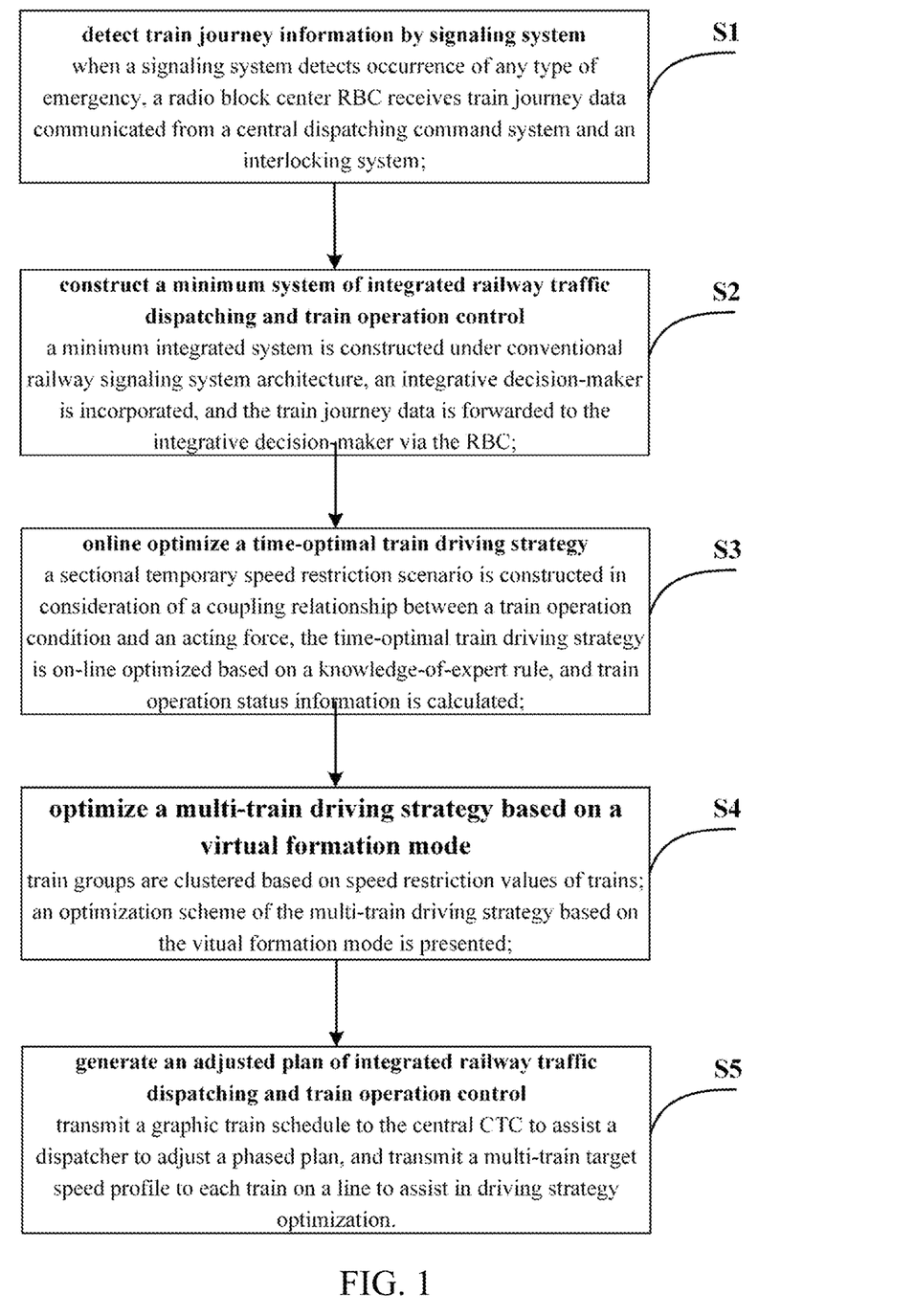
FIG. 1 is a flow diagram of a method for integrating railway traffic dispatching and train operation control.

The disclosure provides a method and a system for integrating railway traffic dispatching and train operation control. A flow diagram of the method is illustrated in FIG. 1.

Step S1: when a signaling system detects occurrence of any type of emergency, a radio block center RBC receives train journey data communicated from a central dispatching command system and an interlocking system;

the train journey data includes train operation status information, line parameters, track circuit status information, and unoccupied receiving track information; the train operation status information includes speed and time of a train on an incoming operation section; and the line parameters include slope gradient, tunnel length, curve radius, neutral zone, and time-space coverage of temporal speed restriction;

Step S1 comprises three sub-steps:

Sub-step S1-1: when any type of emergency (including infrastructure failure, foreign object intrusion, and passenger traffic surge) occurs, the dispatcher issues a phased plan adjusted and a dispatching command to respective trains and railway stations within coverage of a dispatching center, and the central dispatching command system transmits the time-space coverage of temporary speed restriction, train receiving and departing times, and train departure sequence to the radio block center RBC in the train operation control system;

Sub-step S1-2: each train within coverage of the dispatching center reports its current location and speed and a movement authority MA request to the radio block center RBC;

Sub-step S1-3: the interlocking system feeds back information including track circuit status and unoccupied receiving track to the RBC based on current location of each train communicated from the RBC.

Step S2: A minimum system of integrated railway traffic dispatching and train operation control is constructed, an integrative decision-maker is incorporated, and the train journey data is forwarded to the integrative decision-maker via the RBC: the integrative decision-maker is configured to generate a graphic train schedule and a multi-train target speed profile with respect to the method for integrating railway traffic dispatching and train operation control, where the graphic train schedule and the multi-train target speed profile being used to assist the dispatcher and the train to adjust in real time a phased plan and a driving strategy, thereby alleviating labor intensity of the operating staff and enhancing railway transportation efficiency.

Figure 2:
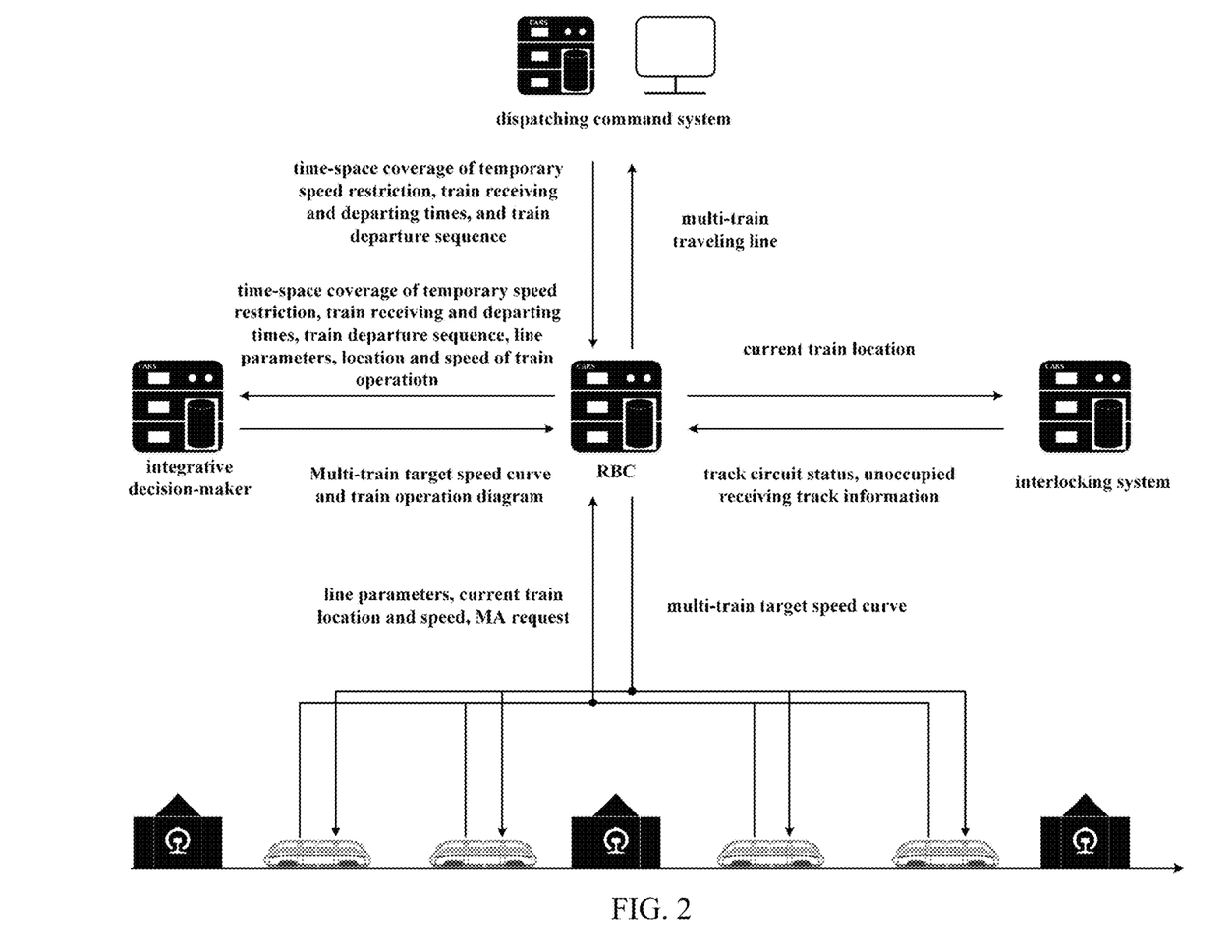
FIG. 2 is a schematic diagram of a minimum system of integrated railway traffic dispatching and train operation control.

Step S2-1: The integrative decision-maker is incorporated to known conventional railway signaling system architecture, the minimum system of integrated railway traffic dispatching and train operation control is constructed to generate an adjusted plan of the integrated railway traffic dispatching and train operation control; the minimum system comprises the central dispatching command system, the RBC, the interlocking system, and the integrated decision-maker, a schematic diagram of which is illustrated in FIG. 2.

Step S2-2: The RBC consolidates all train journey data communicated from respective signaling sub-systems and transmits the train journey data to the integrated decision-maker.

Step S3: a time-optimal train driving strategy is on-line optimized: a sectional temporary speed restriction scenario is constructed in consideration of a coupling relationship between a train operation condition and an acting force, the time-optimal train driving strategy is on-line optimized based on a knowledge-of-expert rule, and train operation status information is calculated.

Step S3-1: constraints of train operation conditions are constructed: when a train is running on a line, it is mainly subjected to a tractive force, a braking force, a basic running resistance, and an additional resistance, and combinations of different acting forces form four basic train operation conditions: motoring, cruising, coasting, and braking; all resulting forces C of the train with respect to different operating conditions are calculated with the equations below:

$$C = \begin{cases} F - W_0 - W_1, \text{Motoring} \\ 0, \text{Cruising} \\ -W_0 - W_1, \text{Coasting} \\ -B - W_0 - W_1, \text{Braking} \end{cases} \quad (1)$$

where F and B denote tractive force and braking force of the train, respectively, which are respectively calculated based on a motoring characteristic profile and a braking characteristic profile; $W_0$ denotes basic running resistance of the train, including running resistance generated by rolling and sliding of wheels on track, resistance generated by train vibration and axle bearing fiction, and air resistance; $W_1$ denotes additional resistance during train running, which is generated when the train travels on a slope or enters a curved or tunnel section.

Since the railway is oriented for ensuring passenger trip quality and restoring movement order as quickly as possible, the objective of optimization is to minimize train delay time, and an optimized multi-train target speed profile with respect to an integrated adjusted plan is generated based on the time-optimal driving strategy for transitions between operating conditions of "maximum traction—cruising—coasting—maximum braking."

Step S3-2: A sectional temporary speed restriction scenario is constructed.

When an emergency occurs, the dispatcher issues a dispatching command such as a sectional temporary speed restriction or blockage command, which generally instructs the train to run at a restricted speed within coverage of a station or a section, or stop in a designated section to wait for failure recovery. Herein, the impact of various emergencies on train operation is abstracted to sectional temporary speed restriction, where sectional blockage may be understood as zero speed in a blocked section. Let a temporal coverage of the $r^{th}$ temporary speed restricted section be $[\tau_{left}^r, \tau_{right}^r]$ and a spatial coverage thereof be $[s_{left}^r, s_{right}^r]$.

Step S3-3: an online optimization scheme for the time-optimal train driving strategy is conducted based on a knowledge-of-expert rule.

When the traveling line of the train does not have an emergent event or the emergent event is minor without affecting train operation, the train may run according to a planned train graph, and the RBC stores planned offline driving strategies under a plurality of knowledge-of-expert rules. When the line is not within coverage of the temporary speed restricted section, the train may directly read an offline driving strategy to control efficient operation of the train in real time. However, when the line is within coverage of a temporary speed restricted section and the offline driving strategy cannot satisfy speed restriction value requirements of the temporary speed restricted section, the knowledge-of-expert rule is utilized. The knowledge-of-expert rule refers to a transitional distance between a coasting condition and another operating condition and a transitional speed difference, which serves to reduce traction energy consumption of a train and ensure rationality of a projected strategy.

Figure 3:
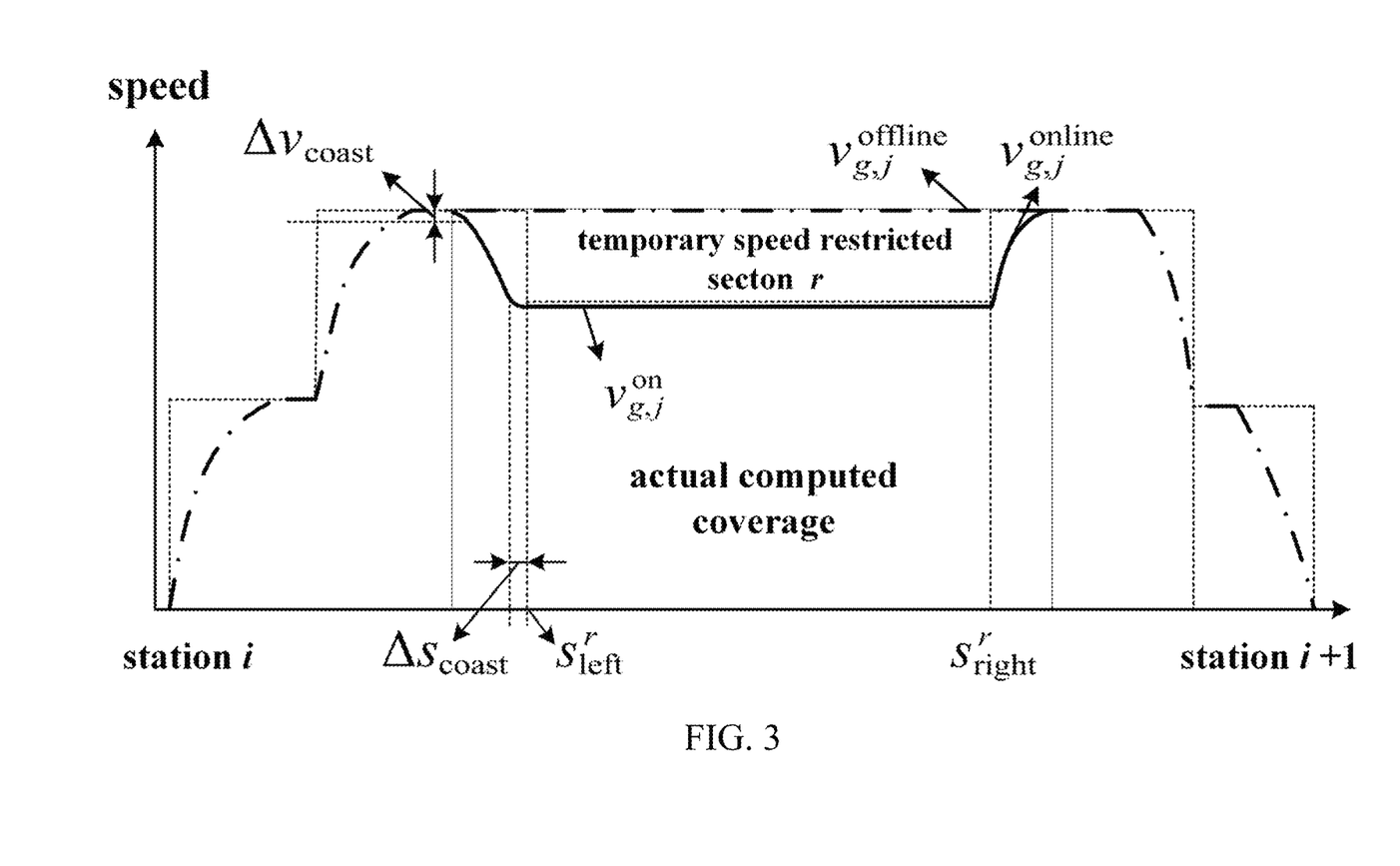
FIG. 3 is a schematic diagram of a scheme of on-line optimizing a time-optimal train driving strategy.

As illustrated in FIG. 3, online optimization of the time-optimal train driving strategy comprises steps below:

Let train g be g∈{1, 2, . . . , G}, station i be i∈{1, . . . , I}, location point j be j∈{1, . . . , J}, and temporary speed restricted section r be r∈{1, . . . , R}, where G, I, J, and R denote respective total numbers of trains, stations, location points, and temporary speed restricted sections; let traveling speeds of train g in a planned offline driving strategy and an online driving strategy be $v_{g,j}^{offline}$ and $v_{g,j}^{online}$, respectively.

Step S3-3-1: the train performs a coasting operation from the temporary speed restricted section left end point $v_{g,j}^{online}$ to $s_{left}^r - \Delta s_{coast}$; the train performs a full-power braking operation from $s_{left}^r - \Delta s_{coast}$ to $v_{g,j}^{offline} - v_{g,j}^{online} < \Delta v_{coast}$, and the train performs a coasting operation from $v_{g,j}^{offline} - v_{g,j}^{online} < \Delta v_{coast}$ to $v_{g,j}^{online} > v_{g,j}^{offline}$;

Step S3-3-2: the train performs a cruising operation from $s_{left}^r$ to the temporary speed restricted section right end point $s_{right}^r$;

Step S3-3-3: the train performs a full-power motoring operation from $s_{right}^r$ to $v_{g,j}^{online} > v_{g,j}^{offline}$;

Step S3-3-4: the train directly reads the planned offline driving strategy in remaining sections without temporary speed restriction;

where $\Delta s_{coast}$ and $\Delta v_{coast}$ denote a transition-to-coasting distance and a transition-to-coasting speed difference, which are both determined based on a specific knowledge-of-expert rule.

The online optimization scheme offers such an advantage: when calculating the train driving strategy for a sectional temporary speed restriction scenario, it is only needed to calculate the train running section affected by temporary speed restriction, eliminating a need to calculate train operation status information of the entire line from the starting station to the destination station, whereby the train driving strategy is online generated in real time to satisfy real-time requirement of solution in practical applications.

Step S3-4: the train operation status information is calculated.

In calculating the online train driving strategy, moving acceleration $a_{g,j}$, speed $v_{g,j}$, and passing time $t_{g,j}$ of train g at location j are calculated according to the equations below:

$$a_{g,j} = \min\left\{\frac{C_{g,j}}{m}/, a_{max}, \delta_{max} \cdot t_{g,j-1} + a_{g,j-1}\right\} \quad (2)$$

$$v_{g,j} = \min\left\{v_r, \sqrt{(v_{g,j-1})^2 + 2 \cdot a_{g,j} \cdot \Delta j}\right\} \quad (3)$$

$$t_{g,j} = t_{g,j-1} + \Delta t_{g,j-1,j} = t_{g,j-1} + \frac{v_{g,j} - v_{g,j-1}}{a_{g,j}} \quad (4)$$

where $C_{g,j}$ denotes the resultant force imposed on train g at location j, m denotes where mass of the train, the moving acceleration $a_{g,j}$ is actually restricted by maximum acceleration $a_{max}$ and maximum impact ratio $\delta_{max}$, the impact ratio being indicative of a change ratio of acceleration to time; the operating speed $v_{g,j}$ is restricted by speed restriction value $v_r$ of the temporary speed restricted section where the train is currently located; $\Delta j$ denotes a distance step when updating the train operation status information.

Figure 4:
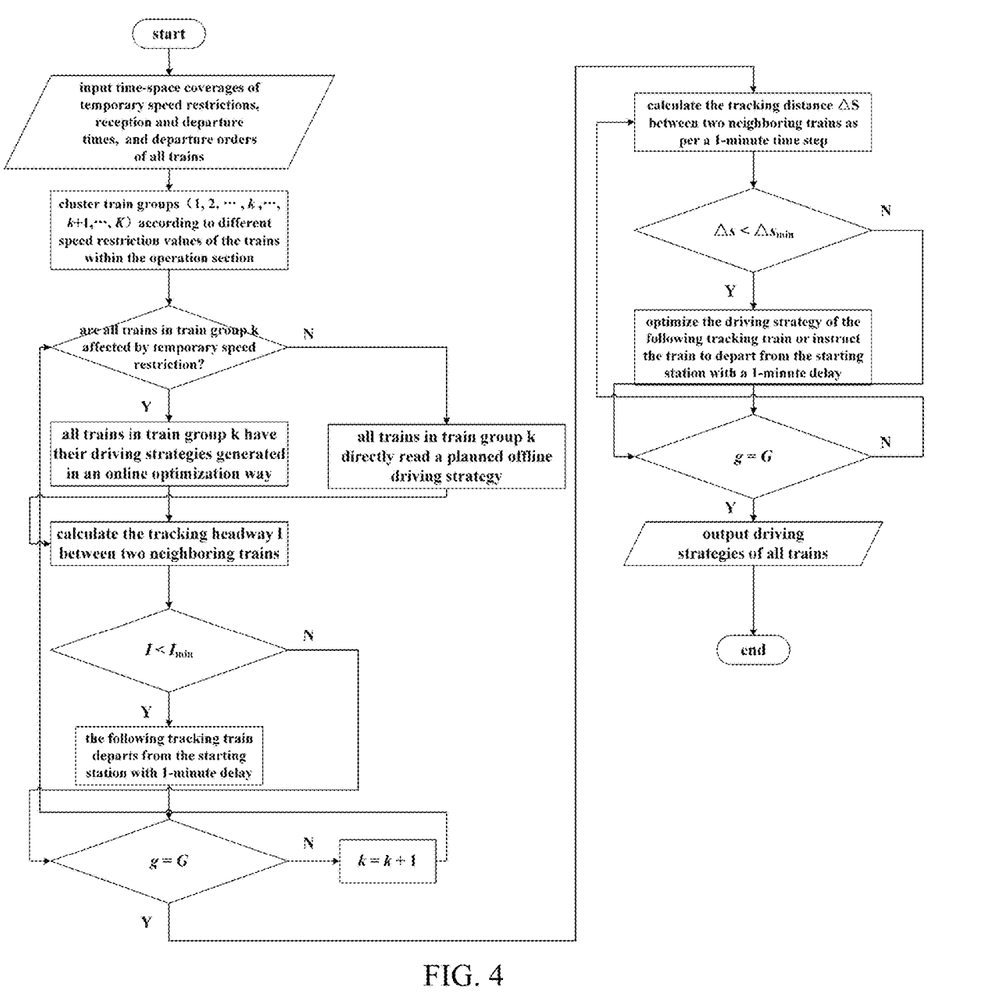
FIG. 4 is a flow diagram of optimizing a multi-train driving strategy based on a virtual formation mode.

Step S4: a multi-train driving strategy is optimized based on a virtual formation mode: train groups are clustered based on speed restriction values of trains; an optimization scheme of the multi-train driving strategy based on the virtual formation mode is presented, a flow diagram of which is illustrated in FIG. 4.

Figure 5:
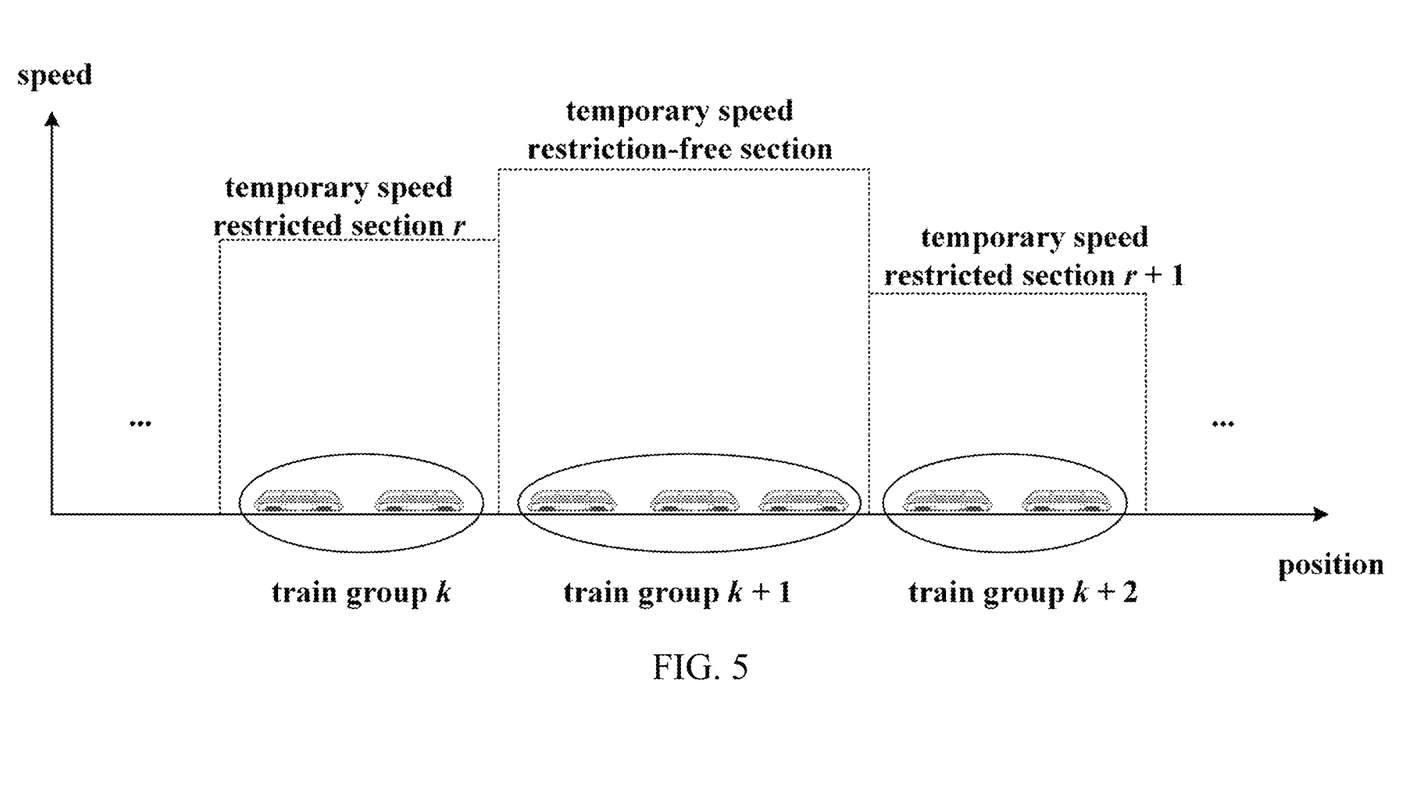
FIG. 5 is a schematic diagram of train group clustering.

Step S4-1: train groups are clustered.

When respective trains within coverage of the dispatching center are running on the line in a tracking manner, the present disclosure assigns all trains affected by emergencies to train groups {1, 2, . . . , k, k+1, . . . , K} according to a concerned multi-agent theory based on different temporary speed restricted sections and temporary speed restriction-free sections on which the respective trains are running, as illustrated in FIG. 5, where K denotes the count of train groups. All trains in each train group constitute a virtual formation, individual trains in the virtual formation being independent of each other, and the driving strategy of tracking trains is optimized based on the virtual formation mode.

Compared with a conventional approach of calculating a multi-train tracking profile, the virtual formation mode offers such an advantage: it eliminates a need of calculating the tracking driving strategies of all following trains based on the location of the leading train; instead, a minimum tracking distance and a minimum tracking headway between the trains in the virtual formation are first satisfied, and then the tracking driving strategies of individual trains in the formation are calculated and uniformed to be completely identical, thereby significantly improving real-time performance of solution finding.

Step S4-2: a multi-train driving strategy is generated.

First, respective trains on the line depart from the starting station according to the planned train graph. Then, respective trains in the temporary speed restriction-free section and different temporary speed restricted sections on the line are determined. If all trains in one virtual formation are running in the temporary speed restriction-free section, the planned offline driving strategy is directly read. If all trains in one virtual formation are running in the temporary speed restricted section, the driving strategy is generated using the online optimization scheme provided in step S3-3.

Step S4-3: a multi-train tracking headway is adjusted.

After the driving strategies of all train are calculated, the safety requirement on minimum inter-train tracking headway at the dispatching level shall be satisfied, so that train operation conflict does not occur on the line section. A specific approach is set forth as such: if the tracking headway I between two neighboring trains does not satisfy the constraint of minimum tracking headway $I_{min}$, the following tracking train departs from the starting station with a 1-minute delay. After all trains have been traversed, the operating status information of all trains is updated.

Step S4-4: the multi-train tracking distance is adjusted.

Secondly, the safety requirement on inter-train minimum tracking distance at the train operation control level should also be satisfied. Since the RBC updates the train MA every other minute, whether the tracking distance $\Delta s$ between two neighboring trains satisfies the constraint of minimum tracking distance is calculated as per a 1-minute time step; if not satisfied, the driving strategy of the following tracking train is optimized or the train is instructed to depart from the starting station with a 1-minute delay, thereby satisfying the safety constraint.

Finally, after all safety requirements at the dispatching and train operation control levels are satisfied, the driving strategies of all trains are outputted.

Step S5: an adjusted plan of the integrated railway traffic dispatching and train operation control is generated: the graphic train schedule is transmitted to the central dispatching command system to assist the dispatcher to adjust the phased plan; the multi-train target speed profile is transmitted to individual trains on the line to assist in driving strategy optimization.

Step S5-1: train operation durations under all train driving strategies in step S4 are calculated to generate a graphic train schedule, and the graphic train schedule and the multi-train target speed profile under the multi-train driving strategy constitute an integrated adjusted plan.

Figure 6:
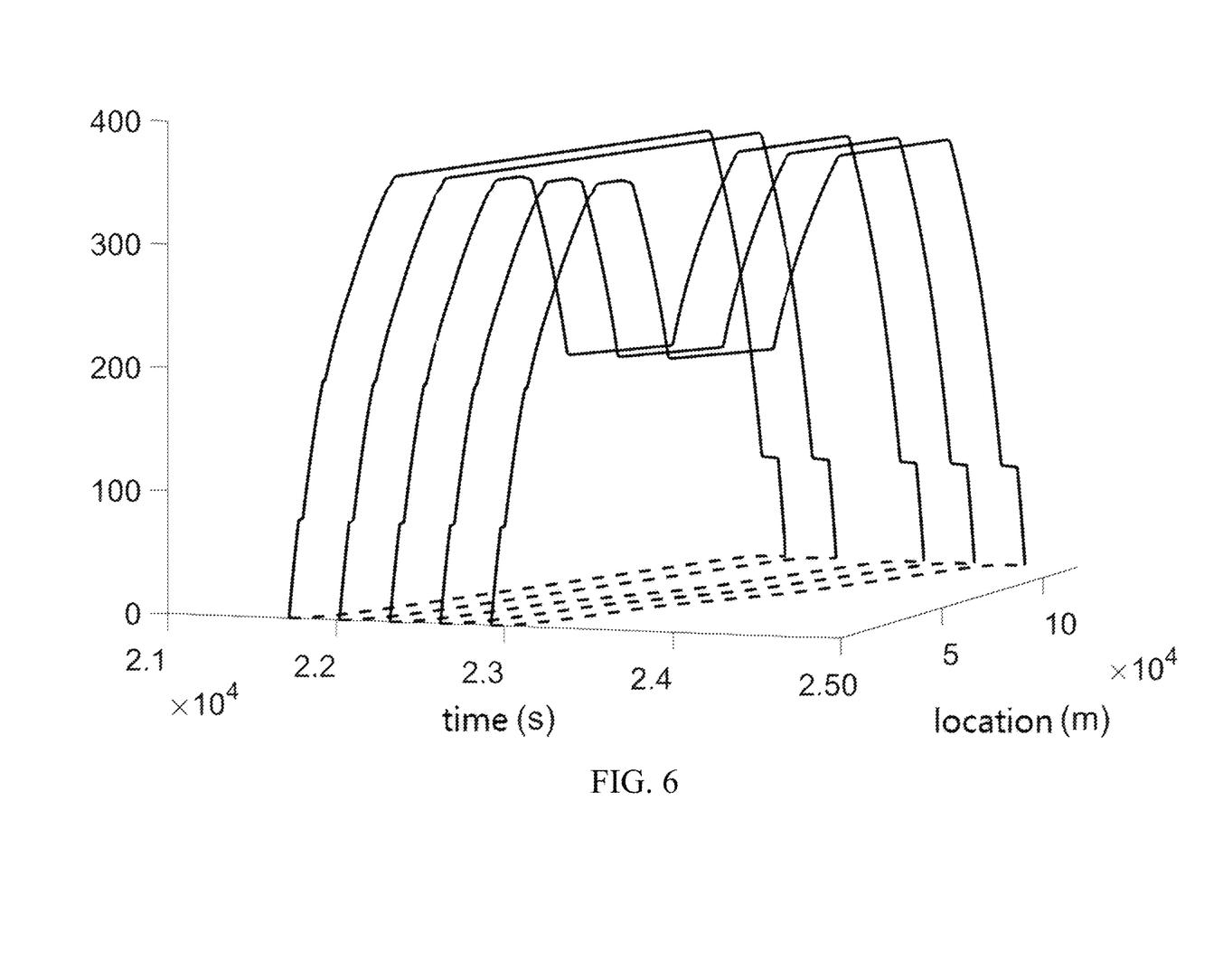
FIG. 6 is an adjusted plan of integrated railway traffic dispatching and train operation control according to an implementation.

With a timetable of down trains of a high-speed railway line within jurisdiction of a railway administration in China as an example, the temporal coverage of the temporary speed restricted section is [6:20, 6:40], the spatial coverage thereof is [40 km, 60 km], the minimum tracking headway $I_{min}$ is set to 5 minutes, and the minimum tracking distance $\Delta s_{min}$ is calculated based on a quasi-moving block system; the integrated adjusted plan according to the present method is calculated, as illustrated in FIG. 6, which is represented by the multi-train target speed profile (solid line in FIG. 6) and the graphic train schedule (dotted line in FIG. 6). The longitudinal coordinate of FIG. 6 represents speed (km/h); FIG. 6 shows that the temporary speed restricted section affects 5 trains. Train 1 and train 2 constitute train formation 1, train 3, train 4, and train 5 constitute train group 2, and the driving strategies of respective trains in each of the two groups are all identical.

Step S5-2: the multi-train target speed profile generated can be directly used as an assistant train driving strategy, which is transmitted via the RBC to individual trains within its coverage, facilitating safe, efficient train operation.

Step S5-3: the graphic train schedule generated can be directly used as an adjusted train graph, which is transmitted via the RBC to the traffic dispatching center of the central dispatching command system, assisting the dispatcher to adjust the phased plan.

In view of the above, the method disclosed herein consolidates the line parameters and calculates the future train operation status information; the graphic train schedule according to the generated integrated adjusted plan may assist the dispatcher to adjust the phased plan, thereby alleviating the train dispatcher's labor intensity and enhancing emergency handling efficiency when an emergency occurs. On the other hand, the multi-train target speed profile in the integrated adjusted plan may facilitate safe, efficient train operation.

What have been illustrated and described supra relate to basic principles, main characteristics, and benefits of the disclosure. Those skilled in the art should understand that the present disclosure is not limited by the implementations supra, and the implementations and description only describe the principle of the disclosure. The present disclosure may have various transformations and modifications without departing from the spirit and scope of the disclosure, and such transformations and modifications all fall within the extent of protection of the disclosure. The extent of protection of the disclosure is limited by the appended claims or their equivalents.

We claim:

1. A method for integrating railway traffic dispatching and train operation control, comprising:

receiving, by a radio block center RBC, train journey data communicated from a central dispatching command system and an interlocking system when a signaling system detects occurrence of any type of emergency;

constructing a minimum system of integrated railway traffic dispatching and train operation control, incorporating an integrative decision-maker, and forwarding the train journey data to the integrative decision-maker via the radio block center RBC;

online optimizing a time-optimal train driving strategy, comprising constructing a sectional temporary speed restriction scenario in consideration of a coupling relationship between a train operation condition and an acting force, online optimizing the time-optimal train driving strategy based on a knowledge-of-expert rule, and calculating train operation status information;

optimizing a multi-train driving strategy based on a virtual formation mode, comprising: clustering train groups based on different speed restriction values of multiple trains, and presenting a multi-train driving strategy optimization scheme based on the virtual formation mode;

generating an adjusted plan of integrated railway traffic dispatching and train operation control, comprising: transmitting a graphic train schedule to the central dispatching command system to assist a dispatcher to adjust a phased plan, and transmitting a multi-train target speed profile to each train on a line to assist in driving strategy optimization, wherein the constructing a minimum system of integrated railway traffic dispatching and train operation control, incorporating an integrative decision-maker, and forwarding the train journey data to the integrative decision-maker via the radio block center RBC further comprises:

incorporating the integrative decision-maker to known conventional railway signaling system architecture, constructing the minimum system of integrated railway traffic dispatching and train operation control to generate the adjusted plan of integrated railway traffic dispatching and train operation control, the minimum system comprising the central dispatching command system, the RBC, the interlocking system, and the integrative decision-maker; and consolidating, by the RBC, all train journey data communicated from respective signaling subsystems to transmit to the integrative decision-maker.

2. The method for integrating railway traffic dispatching and train operation control according to claim 1, wherein the receiving, by a radio block center RBC, train journey data communicated from a central dispatching command system and an interlocking system when a signaling system detects occurrence of any type of emergency further comprises:

issuing, by the dispatcher, the phased plan adjusted and a dispatching command to each train and each station within coverage of a dispatching center when any type of emergency including infrastructure failure, foreign object intrusion, and passenger traffic surge occurs, transmitting, by the central dispatching command system, time-space coverage of temporary speed restriction, times of train reception and departure, and train departure sequence to the radio block center RBC of a train operation control system;

reporting, by each train within coverage of the dispatch center, its current location and speed and a movement authority MA request to the radio block center RBC; and feeding back, by the interlocking system, information including track circuit status and unoccupied receiving track information to the RBC based on the current location of each train communicated from the RBC.

3. The method for integrating railway traffic dispatching and train operation control according to claim 1, wherein the online optimizing a time-optimal train driving strategy further comprises:

constructing constraints of train operation conditions, where a resultant force C of a train with respect to different operating conditions is calculated according to equations below:

$$C = \begin{cases} F - W_0 - W_1, \text{Motoring} \\ 0, \text{Cruising} \\ -W_0 - W_1, \text{Coasting} \\ -B - W_0 - W_1, \text{Braking} \end{cases} \quad (1)$$

where F and B denote tractive force and braking force of the train, respectively, which are respectively calculated based on a motoring characteristic profile and a braking characteristic profile; $W_0$ denotes basic running resistance of the train, including running resistance generated by rolling and sliding of wheels on a rail, resistance generated by train vibration and axle bearing fiction, and air resistance; $W_1$ denotes additional resistance during train running, which is generated when the train travels on a slope or enters a curved or tunnel section;

constructing the sectional temporary speed restriction scenario, comprising: issuing, by the dispatcher, a dispatching command including a sectional temporary speed restriction or blockage command upon occurrence of an emergency, which instructs the train to move at a restricted speed within coverage of a station or a line section, or stop at a designated section to wait for failure recovery; impact of various emergencies on train operation is abstracted to sectional temporary speed restriction, wherein sectional blockage is understood as zero speed in a blocked section; letting a temporal coverage of an $r^{th}$ section affected by temporary speed restriction be $[\tau_{left}^r, \tau_{right}^r]$ and a spatial coverage thereof be $[s_{left}^r, s_{right}^r]$, generating an online optimization scheme for the time-optimal train driving strategy based on a knowledge-of-expert rule, the online optimization scheme comprising: letting train g be $g \in \{1, 2, \ldots, G\}$, station i be $i \in \{1, \ldots, I\}$ location point j be $j \in \{1, \ldots, J\}$, and temporary speed restricted section r be $r \in \{1, \ldots, R\}$, where G, I, J, and R denote respective total numbers of trains, stations, location points, and temporary speed restricted sections; letting traveling speeds of train g under a planned offline driving strategy and an online driving strategy be $v_{g,j}^{offline}$ and $v_{g,j}^{online}$, respectively; calculating the train operation status information, wherein in calculating the online train driving strategy, moving acceleration $a_{g,j}$, speed $v_{g,j}$, and passing time $t_{g,j}$ of train g at location point j are calculated according to equations below:

$$a_{g,j} = \min\left\{\frac{C_{g,j}}{m}, a_{max}, \delta_{max} \cdot t_{g,j-1} + a_{g,j-1}\right\} \quad (2)$$

$$v_{g,j} = \min\left\{v_r, \sqrt{(v_{g,j-1})^2 + 2 \cdot a_{g,j} \cdot \Delta j}\right\} \quad (3)$$

$$t_{g,j} = t_{g,j-1} + \Delta t_{g,j-1,j} = t_{g,j-1} + \frac{v_{g,j} - v_{g,j-1}}{a_{g,j}} \quad (4)$$

where $C_{g,j}$ denotes a resultant force imposed on train g at location point j, m denotes mass of the train, moving acceleration $a_{g,j}$ is actually restricted by maximum acceleration $a_{max}$ and maximum impact ratio $\delta_{max}$, the impact ratio being indicative of a change ratio of acceleration to time; train traveling speed $v_{g,j}$ is restricted by speed restriction value $v_r$ in the temporary speed restricted section where the train is currently located; $\Delta_j$ denotes a distance step for updating the train operation status information; $\Delta t_{g,j-1,j}$ denotes the running time of train g within section (j-1, j).

4. The method for integrating railway traffic dispatching and train operation control according to claim 3, wherein the online optimizing a time-optimal train driving strategy further comprises:

performing, by the train, a coasting operation from left end point $s_{left}^r$ of the temporary speed restricted section to $s_{left}^r - \Delta s_{coast}$; performing, by the train, a maximum braking operation from $s_{left}^r - \Delta s_{coast}$ to $v_{g,j}^{offline} - v_{g,j}^{online} < \Delta v_{coast}$; performing, by the train, the coasting operation from $v_{g,j}^{offline} - v_{g,j}^{online} < \Delta v_{coast}$ to $v_{g,j}^{online} > v_{g,j}^{offline}$;

performing a full-power motoring operation from $s_{left}^r$ to right end point $s_{right}^r$ of the temporary speed restricted section;

performing a full-power motoring operation from $s_{right}^r$ to $v_{g,j}^{online} > v_{g,j}^{offline}$;

reading, by the train, directly the planned offline driving strategy in remaining sections without temporary speed restriction;

wherein $\Delta s_{coast}$ and $\Delta s_{coast}$ represent a transition-to-coasting distance and a transition-to-coasting speed difference, respectively, both of which are determined by a knowledge-of-expert rule.

5. The method for integrating railway traffic dispatching and train operation control according to claim 1, wherein the optimizing a multi-train driving strategy based on a virtual formation mode further comprises:

clustering train groups, comprising: assigning all trains affected by an emergency to respective train groups {1, 2, ..., k, k+1, ..., K} according to different temporary speed restricted sections and temporary speed restriction-free sections in which respective trains are running, where K denotes a count of train groups, wherein all trains in each train group constitute a virtual formation, individual trains in the virtual formation are independent of each other, and a train tracking driving strategy is optimized based on the virtual formation mode;

generating the multi-train driving strategy, wherein respective trains on the line first depart from a scheduled starting station according to a planned train graph, then respective trains in a temporary speed restriction-free section and different temporary speed restricted sections on the line are identified; if all trains in a virtual formation are running in the temporary speed restriction-free section, the planned offline driving strategy is directly read; if all trains in a virtual formation are running in a temporary speed restricted section, a driving strategy is generated using the online optimization scheme;

adjusting an inter-train tracking headway, wherein after the driving strategies for all trains are completely calculated, a safety requirement on a minimum inter-train tracking headway at a dispatching level is satisfied so that no train operation conflict occurs on the line;

adjusting an inter-train tracking distance, wherein since the RCB updates the train MA every other minute, whether a tracking distance $\Delta s$ between two neighboring trains satisfies constraint of the minimum tracking distance $\Delta s_{min}$ is calculated as per a 1-minute time step; if not, the driving strategy of the following train is optimized or the following train is instructed to depart late from the starting station so that it satisfies safety constraints; after all safety constraints with respect to dispatching and train operation control are satisfied, driving strategies of all trains are outputted.

6. The method for integrating railway traffic dispatching and train operation control according to claim 1, wherein the feeding back, by the interlocking system, information including track circuit status and unoccupied receiving track information to the RBC based on the current location of each train communicated from the RBC further comprises:

calculating train operation durations in the driving strategies of all trains to generate a graphic train schedule, wherein the graphic train schedule and a multi-train target speed profile in the multi-train driving strategy constitute an integrated adjusted plan;

transmitting, by the RBC, the multi-train target speed profile which directly acts as an assistant train driving strategy to each train within coverage of the RBC, facilitating safe, efficient train operation; and transmitting, by the RBC, the generated graphic train schedule which directly acts as an adjusted train graph, to a movement dispatching center in the central dispatching command system, assisting the dispatcher to adjust the phased plan.

7. A integrated system of railway traffic dispatching and train operation control, comprising the method for integrated railway traffic dispatching and train operation control according to claim 1.

* * * * *